April 3, 1934.   H. FUCHS   1,953,219
SNUBBER
Filed Dec. 2, 1932   2 Sheets-Sheet 1
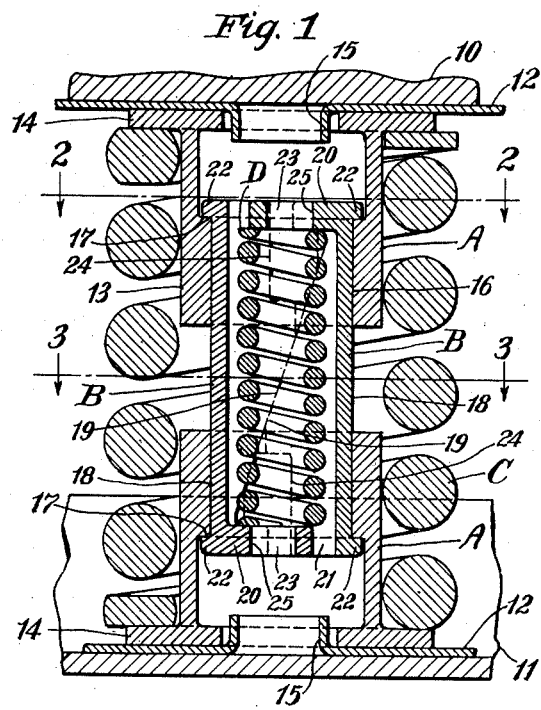
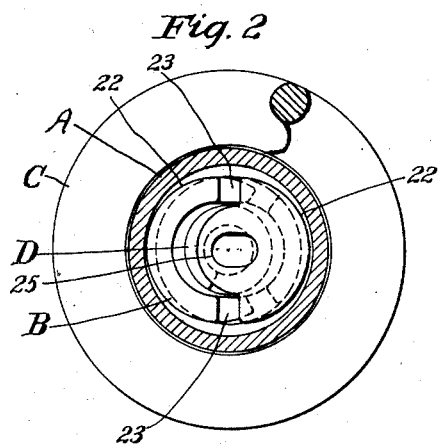
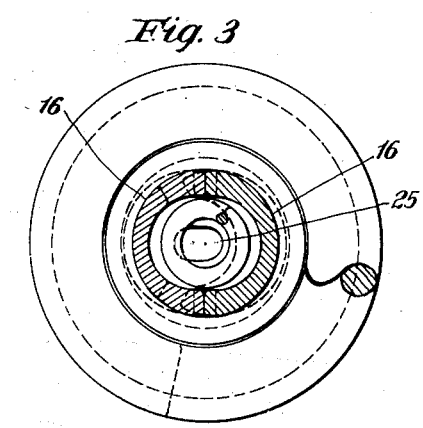
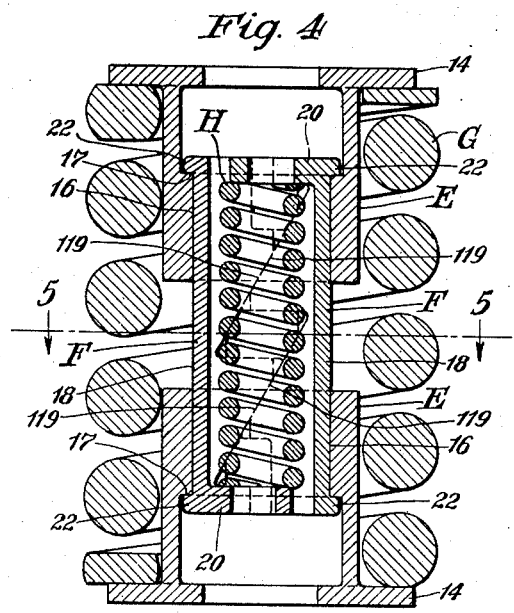
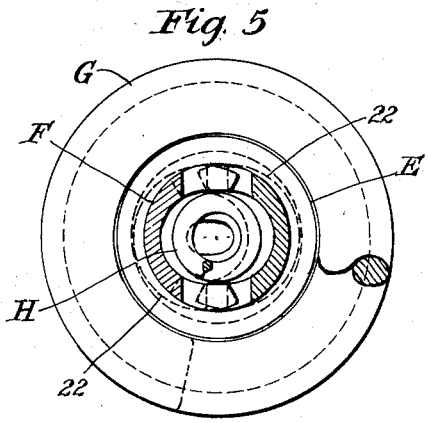
Inventor
Henry Fuchs
Atty.

April 3, 1934.  H. FUCHS  1,953,219
SNUBBER
Filed Dec. 2, 1932  2 Sheets-Sheet 2
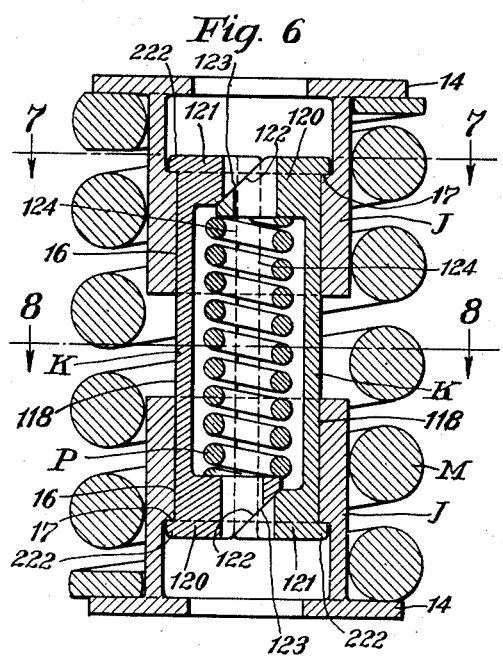
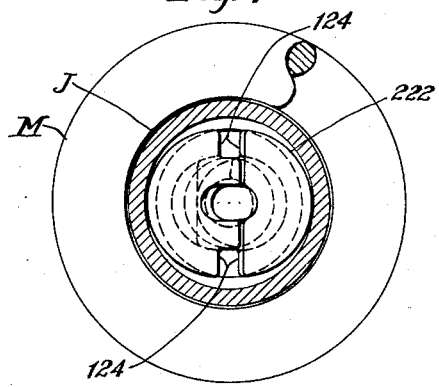
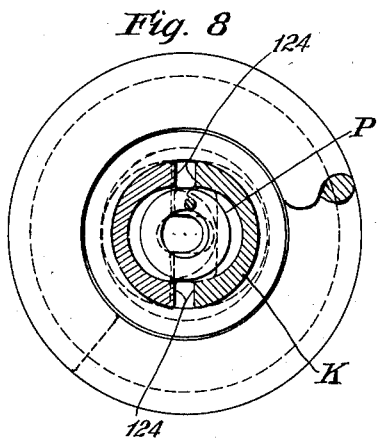
Inventor
Henry Fuchs
Atty.

Patented Apr. 3, 1934

1,953,219

UNITED STATES PATENT OFFICE 1,953,219

SNUBBER

Henry Fuchs, Chicago, Ill., assignor to W. H. Miner, Inc., Chicago, Ill., a corporation of Delaware Application December 2, 1932, Serial No. 645,366

7 Claims. (Cl. 267—9)

This invention relates to improvements in friction snubbers especially designed for use in connection with the springs of railway car trucks.

One object of the invention is to provide a simple and efficient friction snubber comprising few parts, which may be cheaply and economically manufactured and readily applied in place of one or more of the usual coil spring units of a cluster of railway car truck springs.

Another object of the invention is to provide a snubbing device of the character specified in the preceding paragraph, wherein the dampening or snubbing effect is had by friction means producing a substantially constant amount of resistance.

A more specific object of the invention is to provide a friction snubber mechanism of a minimum number of parts by the employment of a pair of duplicate end casings and a pair of duplicate friction shoes having wedging engagement with each other and frictional engagement with the casings, together with spring means opposing relative approach of the casings and movement of the casings with respect to the shoes and additional spring means exerting a substantially constant pressure for holding the shoes in wedging engagement with each other.

Other objects of the invention will more clearly appear from the description and claims hereinafter following.

In the drawings, forming a part of this specification, Figure 1 is a vertical sectional view through a portion of the bolster and spring plank of a railway car truck, illustrating my improved snubber mechanism in connection therewith and showing said snubber mechanism in vertical section. Figures 2 and 3 are horizontal sectional views, corresponding respectively to the lines 2—2 and 3—3 of Figure 1. Figure 4 is a vertical sectional view similar to Figure 1, with the bolster and spring plank omitted, illustrating another embodiment of the invention. Figure 5 is a horizontal sectional view, corresponding substantially to the line 5—5 of Figure 4. Figure 6 is a view similar to Figure 4, illustrating still another embodiment of the invention. And Figures 7 and 8 are horizontal sectional views, corresponding respectively to the lines 7—7 and 8—8 of Figure 6.

Referring first to the embodiment of the invention illustrated in Figures 1, 2 and 3, the truck bolster of a railway car is indicated by 10 and the cooperating spring plank by 11. The usual spring follower plates 12—12 are employed and bear on opposite ends of the truck springs, which springs are not shown in the drawings.

My improved friction snubber mechanism is substituted for one of the coil spring units of the cluster of truck springs. In case four springs are in the cluster, it is preferable to substitute the improved snubber mechanism for one of the outer springs. When a central spring unit is employed is, for example, in connection with a cluster of five springs, my improved snubber mechanism is preferably substituted for the central unit of the spring cluster.

As shown in Figures 1, 2, and 3, my improved friction snubber mechanism comprises broadly a pair of friction casings A—A, which function as followers; two friction shoes B—B; a heavy coil spring C; and a lighter coil spring D.

The two friction casings A—A are of similar design, each comprising a substantially cylindrical shell-like portion 13 having an annular, laterally outstanding abutment flange 14 at the outer end. The end of the casing A carrying the flange 14 is preferably partially closed, as clearly shown in Figure 1, an opening of sufficient size being left to accommodate the usual outstanding annular flange 15 of the corresponding spring follower plate 12. Each casing A is of substantially cylindrical interior cross section, thereby providing opposed curved friction surfaces 16—16 with which the friction shoes B—B cooperate, as hereinafter more fully pointed out. The friction surfaces 16—16 of the casing A extend for part only of the length of the casing, the portion of the casing between the friction surfaces and the flanged end of the casing being enlarged, as clearly shown in Figure 1, thereby providing a substantially annular abutment shoulder 17 at the inner ends of the friction surfaces 16—16.

The friction shoes B—B, which cooperate with the friction casings A—A, are of similar design but reversely arranged, end for end. Each shoe has an outer, partly cylindrical, friction surface 18, which cooperates with the friction surfaces 16—16 at the corresponding sides of the casings A—A. As most clearly shown in Figures 2 and 3, the main body portion of each shoe B is of curved cross section. The inner ends of the side wall portions of the shoe are inclined with respect to the longitudinal axis of the mechanism, as clearly indicated at 19. At one end the shoe B has an inward enlargement 20, which forms a spring abutment or follower member. At the opposite end the shoe is preferably open, as indicated at 21, to accommodate the spring follower member 20 of the other shoe B. The two shoes B—B are reversely arranged, end for end, with the inclined edges 19—19 thereof in engagement with each other, as clearly shown in Figure 1. When the shoes B—B are assembled in operative relation with the casings A—A, the friction unit formed by the shoes is of substantially true cylindrical cross section, with the outer friction surfaces 18—18 thereof interfitting with the friction surfaces 16—16 and 16—16 of the two casings A—A. Each shoe has laterally extending, curved flanges 22—22 at opposite ends thereof, which cooperate with the interior shoulders 17—17 of the two casings A—A. The flanges 22—22 are of the same curvature as the inner curved surfaces 16—16 of the casings A—A so that when the unit formed by the shoes B—B is contracted, the flanges 22—22 will pass freely through the opening between said surface 16—16. In order to permit the necessary contraction of the unit formed by the shoes B—B, clearance is provided between the inner edges of the side wall portions of the shoes, as indicated at 23—23, and the side walls are cut away at their outer ends, as indicated at 24—24, thereby permitting the necessary relative longitudinal movement of the two shoes B—B to reduce the unit to such a size as to permit assembling with the casings A—A.

The spring C is interposed between the flanges 14—14 of the two casings A—A and surrounds the shell portions of these casings.

The additional coil spring D is arranged between the friction shoes and has its opposite ends bearing on the spring follower members 20—20 thereof. The spring D is under a predetermined amount of initial compression so as to urge the shoe B at the right-hand side of the mechanism, as shown in Figure 1, upwardly and the shoe B at the left-hand side thereof downwardly, thereby pressing the inclined edges 19—19 of the two shoes against each other and holding the shoes against the friction surfaces of the two casings with a substantially constant pressure throughout the operation of the device.

In assembling the mchanism, the friction unit formed by the two shoes B—B is contracted to such a size that the flanges 22—22 and 22—22 of the two shoes will pass freely through the inner ends of the casings A—A. To temporarily hold the unit contracted, a clamping means, such as a bolt, is employed, the shoes B—B being provided with aligned openings 25—25 to accommodate the shank of the bolt. When the parts have been assembled, the clamping means is removed to permit expansion of the unit. With the unit thus contracted, one end thereof is inserted in the lower casing A and the spring C telescoped over this casing. The upper casing A is then applied by inserting the cylindrical shell portion thereof within the upper end of the spring C and telescoping said shell portion over the upper ends of the shoes B—B. The unit formed by the shoes B—B is then permitted to expand so as to engage the retaining flanges 22—22 and 22—22 of the shoes over the shoulders 17—17 of the casings A—A. As will be evident, when the parts have been thus assembled, the flanges 22—22 and 22—22 of the shoes will limit relative separation of the casings A—A and also center the friction shoes B—B longitudinally of the mechanism with respect to the casings.

In the operation of the improved friction snubber shown in Figures 1, 2, and 3, upon relative approach of the bolster 10 and the spring plank 11 and compression of the usual truck springs between the spring follower plates 12—12, the upper and lower casings A—A of the snubber will be moved toward each other, thereby compressing the spring C between the flanges 14—14 of said casings and moving the friction surfaces 16—16 of the casings along the friction surfaces of the two shoes B—B, thereby snubbing the action of the cluster of truck springs. Upon recoil of the truck springs, the bolster 10 and spring plank 11 will be forced apart, thereby permitting expansion of the friction snubber. During this action, the spring C returns the casings A—A to the normal position shown in Figure 1. Regardless of the relative positions of the casings A—A and the shoes B—B at the end of full compression of the mechanism, the parts will be restored to the normal position shown in Figure 1 by engagement of the shoulders 17—17 of the casings with the flanges 22—22 and 22—22 at the opposite ends of the shoes. As will be evident, if the shoes are so positioned at the end of the compression stroke of the snubber that the shoulder 17 of one of the casings will engage the flanges 22—22 at the corresponding ends of the shoes before the shoulder 17 of the other casing engages the flanges 22—22 at the opposite ends of the shoes, the shoulder of the first named casing will effect entirely the restoration.

Referring next to the embodiment of the invention illustrated in Figures 4 and 5, my improved snubber mechanism comprises a pair of casings E—E; a pair of friction shoes F—F; a relatively heavy spring G; and an additional lighter spring H.

The friction casings E—E are of the same design as the casings A—A hereinbefore described in connection with Figure 1 and have flanges 14—14 at the outer ends and interior, opposed friction surfaces 16—16, which cooperate with the shoes F—F. The casings E—E are also provided with shoulders at the inner ends of the friction surfaces, similar to the shoulders shown in Figure 1, said shoulders being indicated by 17—17 in Figure 4.

The friction shoes F—F are of similar design and have outer friction surfaces which cooperate with the friction surfaces 16—16 and 16—16 of the two casings in the same manner as the friction surfaces of the shoes B—B in the embodiment of the invention shown in Figure 1, said friction surfaces in Figure 4 also being indicated by 18—18. The shoes F—F are reversely arranged, end for end, each shoe being open at one end and having spring follower means at the other end accommodated within the opening provided therefor on the opposed shoe, the spring follower means of said shoes being identical with the spring follower means of the shoes B—B in Figure 1 and also being indicated by 20—20. The side walls of the shoes F—F have two sets of interengaging inclined edges 119—119 and 119—119, which are located at opposite ends of the shoes, as shown in Figure 4. The side walls of the shoes are cut away in a manner similar to that described in connection with Figure 1 so as to provide for the necessary contraction of the unit formed by the two shoes to permit insertion of the ends of the shoes into the friction shell portions of the casings E—E. In order to limit the relative separation of the casings E—E and center the friction shoes F—F, these shoes are also provided with curved flanges 22—22 and 22—22 at opposite ends thereof engaging with the shoulders 17—17 of the two casings.

The heavy coil spring G is disposed between the flanges 14—14 of the two casings E—E and yieldingly opposes movement of the casings toward each other.

The additional spring H is interposed between the spring follower members 20—20 of the two shoes F—F and operates in a similar manner to the spring D hereinbefore described in connection with Figure 1, being under a predetermined amount of initial compression so as to hold the friction surfaces of the shoes F—F against the friction surfaces 16—16 and 16—16 of the casings E—E with a substantially constant pressure.

Referring next to the embodiment of the invention illustrated in Figures 6, 7, and 8, the mechanism comprises two friction casings J—J, in all respects identical with the friction casings A—A hereinbefore described; two friction shoes K—K; a relatively heavy coil spring M; and an additional lighter coil spring P.

The friction casings J—J have end flanges 14—14, interior friction surfaces 16—16, and limiting stop shoulders 17—17, in all respects similar to the parts 14, 16, and 17 hereinbefore described in connection with Figure 1.

The spring M, which surrounds the friction casings J—J, bears on the flanges 14—14 thereof and yieldingly opposes relative movement of the casings toward each other.

The friction shoes K—K are of similar design and have transversely curved, exterior friction surfaces 118—118 which engage with the friction surfaces 16—16 and 16—16 of the two friction casings J—J. Each shoe is provided with lateral enlargements 120 and 121 at opposite ends thereof. As clearly shown in Figure 6, the shoes K—K are reversely arranged, end for end, so that the enlargement 120 of one of said shoes and the enlargement 121 of the other of said shoes are disposed at the same end of the mechanism. The enlargements 120 and 121 at each end of the mechanism have interengaging faces 122 and 123 which are inclined with respect to the longitudinal axis of the mechanism. The surface 122 of the enlargement 120 of each shoe K and the outer friction surface 118 thereof converge outwardly of the end of the shoe, and the cooperating surface 123 of the enlargement 121 of the other shoe and the outer surface 118 of said shoe diverge outwardly of the end of this shoe. The inner end faces of the enlargements 120—120 of the two shoes are inwardly offset with respect to the enlargements 121—121, thereby presenting spring abutments, which are disposed inwardly of the enlargements 121—121 to such an extent as to ensure the spring pressure being applied only to the enlargements 120—120. The shoes K—K are provided with retaining flanges 222—222 and 222—222 at opposite ends thereof, which cooperate with the shoulders 17—17 of the casings J—J in a manner similar to that of the flanges 22—22 and 22—22 of the shoes B—B and the shoulders 17—17 of the casings A—A in Figure 1. In order to permit the necessary contraction of the unit formed by the friction shoes K—K to allow the flanges 222—222 and 222—222 thereof to pass through the open ends of the shells of the casings J—J, the inner edges of the shoes, which are indicated by 124—124, are spaced apart, as clearly shown in Figures 6, 7, and 8, to provide the required clearance.

The spring coil P is interposed between the abutments 120—120 of the shoes K—K and is under a predetermined amount of initial compression so as to press the shoes apart in the same manner as the shoes A—A described in connection with Figure 1 are pressed apart, thereby holding the friction surfaces 118—118 of the shoes K—K against the friction surfaces 16—16 and 16—16 of the two casings J—J with a substantially constant pressure.

The friction snubbers shown in Figures 4 to 8 inclusive operate in substantially the same manner as the snubber described in connection with Figures 1, 2, and 3, with the exception that the wedging action takes place along two pairs of friction surfaces located at opposite ends of the mechanism, instead of a single pair of such surfaces located midway between the ends of the shoes.

I have herein shown and described what I now consider the preferred manner of carrying out my invention, but the same is merely illustrative and I contemplate all changes and modifications that come within the scope of the claims appended hereto.

I claim:

1. In a friction snubber mechanism for truck springs of railway cars, the combination with a pair of end casings movable toward and away from each other, said casings having interior friction surfaces; of spring means yieldingly opposing relative approach of the casings; a pair of friction shoes having interengaging faces on the inner sides thereof, said faces being inclined to the longitudinal axis of the mechanism, thereby providing shoes of tapered formation; an interior spring abutment on each shoe at the narrower end thereof; and a spring under initial compression bearing at opposite ends on the abutments respectively of the two shoes.

2. In a friction snubber mechanism for truck springs of railway cars, the combination with a pair of end casings having interior friction surfaces disposed lengthwise of the mechanism; of a spring opposing relative movement of the casings toward each other; a pair of friction shoes having their opposite ends telescoped within the casings, each shoe having an outer friction surface disposed lengthwise of the mechanism and slidingly engaging the corresponding interior surfaces of the casings, each shoe having a spring abutment at one end thereof, each shoe also having a face on the inner side thereof inclined with respect to the friction surface of said shoe in a direction away from the spring abutment thereof, said shoes being reversely arranged with the inclined faces thereof in engagement with each other; and a spring under initial compression between said abutments of the shoes, said spring bearing on said abutments.

3. In a friction snubber mechanism for truck springs of railway cars, the combination with a pair of end casings movable toward and away from each other, each end casing having two opposed interior friction surfaces; of a pair of friction shoes over the opposite ends of which said casings are telescoped, each shoe having a longitudinally disposed, exterior friction surface slidingly engaging the corresponding friction surfaces of the casings; and spring means between said shoes pressing one shoe away from one end of the mechanism and the other shoe away from the opposite end of the mechanism, each of said shoes having an inner face inclined to the outer friction surface thereof, said shoes being reversely arranged with the inclined faces thereof in engagement with each other, said inclined face of each shoe being inclined in a direction toward the end of the mechanism away from which said shoe is pressed.

4. In a friction snubber mechanism, the combination with a pair of end casings movable toward and away from each other; of a spring surrounding said casings and yieldingly opposing relative approach thereof; a pair of friction shoes having their opposite ends telescoped within the casings and in sliding frictional contact with the friction surfaces thereof; spring follower means at one end of each shoe rigid with said shoe, each shoe having a pair of substantially parallel inclined faces on the inner side thereof, said faces being at opposite ends of the shoe, each of said faces and the outer side face of the shoe converging toward the end of the shoe which has the spring follower means thereon, said shoes being reversely arranged with the inclined faces thereof in engagement and the spring follower means at opposite ends of the mechanism; and a spring under initial compression between said spring follower means of the two shoes, said spring urging the spring follower means apart.

5. In a friction snubber mechanism, the combination with a pair of end casings movable toward and away from each other; of spring means opposing relative approach of said casings; a pair of friction shoes, each having a lateral enlargement at one end forming a spring abutment, said enlargement having a face on the inner side thereof inclined with respect to the outer side of the shoe, said inner and outer faces converging outwardly of the end of the shoe, each shoe also having an enlargement at the other end provided with a face on the inner side thereof substantially parallel to said first named face, said shoes being reversely arranged with the first named face of each shoe engaged with the second named face of the other shoe and the spring abutments disposed at opposite ends of the mechanism; and a spring under compression having its opposite ends bearing on said spring abutments, said casings being telescoped over the ends of the shoes and having sliding frictional engagement therewith.

6. In a friction snubber mechanism, the combination with a pair of end casings movable toward and away from each other, said casings having interior stop shoulders; of spring means yieldingly resisting relative approach of said casings; a pair of friction shoes having their opposite ends telescoped within the casings respectively, said shoes having laterally projecting retaining flanges engageable with the shoulders of the casings, said shoes also having longitudinally disposed side edges spaced laterally apart a distance at least equal to the combined amount of projection of the flanges from the shoes, said shoes having interengaging faces at opposite ends, said interengaging faces being inclined to the longitudinal axis of the mechanism; and spring means under initial compression for pressing said faces of the shoes into engagement with each other.

7. In a friction snubber mechanism, the combination with a pair of friction shoes having exterior, longitudinally extending, friction surfaces, each shoe having a spring abutment at one end, said shoes also having interengaging faces on the inner sides thereof inclined to the longitudinal axis of the mechanism, the face of each shoe being inclined in a direction away from the spring abutment of said shoe; of a spring under initial compression bearing at opposite ends on the abutments respectively of the two shoes; a follower member having a friction casing formed rigid therewith and telescoped over the corresponding ends of the friction shoes and having sliding engagement with the friction surfaces thereof; a second follower member having means rigid therewith surrounding the opposite ends of said shoes and holding said shoes against lateral separation; stop means for limiting longitudinal separation of said follower members and shoes; and spring means yieldingly opposing relative approach of said follower members.

HENRY FUCHS.